US008776072B2

(12) United States Patent
Kishita

(10) Patent No.: US 8,776,072 B2
(45) Date of Patent: Jul. 8, 2014

(54) CONTROL APPARATUS, CONTROL SYSTEM AND COMPUTER PROGRAM

(75) Inventor: Yuri Kishita, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 762 days.

(21) Appl. No.: 12/994,986

(22) PCT Filed: Jun. 29, 2009

(86) PCT No.: PCT/JP2009/003579
§ 371 (c)(1),
(2), (4) Date: Nov. 29, 2010

(87) PCT Pub. No.: WO2010/013458
PCT Pub. Date: Feb. 4, 2010

(65) Prior Publication Data
US 2011/0078694 A1 Mar. 31, 2011

(30) Foreign Application Priority Data

Jul. 30, 2008 (JP) .................................. 2008-196518

(51) Int. Cl.
*G06F 7/00* (2006.01)
*G06F 9/46* (2006.01)
*G06F 9/48* (2006.01)
*G06F 9/52* (2006.01)

(52) U.S. Cl.
CPC ................ *G06F 9/4881* (2013.01); *G06F 9/52* (2013.01)
USPC .............................. 718/103; 718/102; 701/36

(58) Field of Classification Search
CPC ........ G06F 9/52; G06F 9/4881; G06F 9/4887
USPC .......................................................... 718/103
See application file for complete search history.

(56) References Cited

U.S. PATENT DOCUMENTS 6,343,249 B1 * 1/2002 Sakai et al. ..................... 701/48
7,086,056 B2 * 8/2006 Fukushima ................... 718/102
(Continued)

FOREIGN PATENT DOCUMENTS

| JP | A-2005-259023 | 9/2005 |
| JP | A-2006-1305 | 1/2006 |
| JP | A-2007-90951 | 4/2007 |
| JP | 2008078769 A * | 4/2008 |
| JP | A-2008-74124 | 4/2008 |
| JP | A-2008-107914 | 5/2008 |
| JP | 2010185687 A * | 8/2010 |

OTHER PUBLICATIONS

International Search Report dated Sep. 15, 2009 in corresponding International Application No. PCT/JP2009/003579.

*Primary Examiner* — Lewis A Bullock, Jr.
*Assistant Examiner* — Kevin X Lu
(74) *Attorney, Agent, or Firm* — Oliff PLC

(57) ABSTRACT

A system management layer changes a current program with a program (door lock failure diagnosis judgment program, security judgment program, door lock judgment program, keyless entry judgment program or the like) to be executed by an application layer, in accordance with an operation mode of on-vehicle equipment. Priorities of programs are previously stored for each operation mode, and a priority judgment program contributes to judge the priority of operation request based on the operation mode. Thus, plural programs of each hierarchal layer are categorized into groups per operation mode, although complicating in the single hierarchal layer. Therefore, it is possible to prevent the priority judgment processing from complicating for the operation request output by each computer program.

17 Claims, 8 Drawing Sheets

(56) References Cited

U.S. PATENT DOCUMENTS

| | | | |
|---|---|---|---|
| 7,120,913 B2* | 10/2006 | Kawase | 718/107 |
| 7,940,689 B2* | 5/2011 | Fukui et al. | 370/252 |
| 2002/0044047 A1* | 4/2002 | Miyakoshi et al. | 340/435 |
| 2004/0064220 A1* | 4/2004 | Kobayashi | 701/1 |
| 2004/0111210 A1* | 6/2004 | Davis et al. | 701/103 |
| 2005/0049722 A1* | 3/2005 | Kobayashi | 700/9 |
| 2005/0216635 A1* | 9/2005 | Nishimura | 710/260 |
| 2008/0010563 A1* | 1/2008 | Nishimura | 714/55 |
| 2008/0068144 A1* | 3/2008 | Sato | 340/426.24 |
| 2012/0136547 A1* | 5/2012 | Miyazaki et al. | 701/70 |

\* cited by examiner

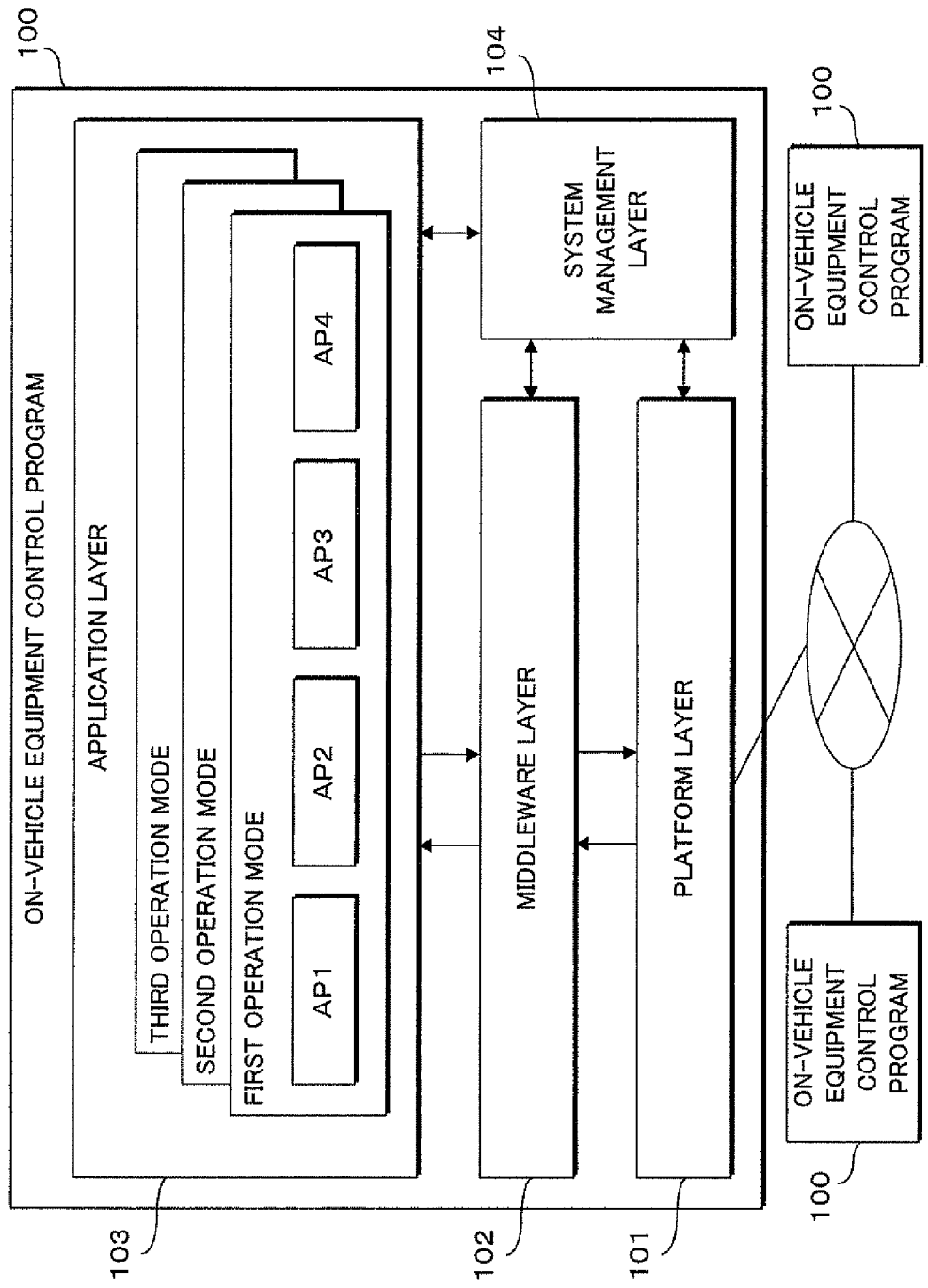

FIG. 4

PRIORITY JUDGMENT TABLE

| OPERATION MODE | PROGRAM TO BE EXECUTED | PRIORITY |
|---|---|---|
| MAINTENANCE MODE | DOOR LOCK FAILURE DIAGNOSIS JUDGMENT PROGRAM | NONE |
| SECURITY MODE | SECURITY JUDGMENT PROGRAM | NONE |
| DRIVER MODE | DOOR LOCK JUDGMENT PROGRAM | 1 |
| | KEYLESS ENTRY JUDGMENT PROGRAM | 2 |

# CONTROL APPARATUS, CONTROL SYSTEM AND COMPUTER PROGRAM

This application is the national phase under 35 U.S.C. §371 of PCT International Application No. PCT/JP2009/003579 which has an International filing date of Jul. 29, 2009 and designated the United States of America.

BACKGROUND OF THE INVENTION

1. Field of the Invention

The present invention relates to a control apparatus, a control system, and a computer program that can control plural equipments, such as on-vehicle equipments, and can facilitate the development, test and the like.

2. Description of Related Art

It is known to mount several varieties of electric equipments on a vehicle (on-vehicle equipment) to provide more sophisticated vehicles. The vehicle requires much more numbers of on-vehicle equipments in order to be sophisticated more. Thus, the enlargement and complication may occur of the control apparatus, such as an electric control unit (ECU) controlling the plural on-vehicle equipments, and of the control program executed by the control apparatus. Hence, the development is considered to be hard, to need longer time and to require higher cost for the control apparatus and computer program.

FIG. 8 is a schematic view for explaining processes performed by a conventional computer program controlling an on-vehicle equipment, and shows an example of computer program performing a door lock processing on a vehicle. The vehicle is provided with the on-vehicle equipment controlling the door lock, and the door lock processing is performed when a user handles a switch on the door to lock the door, the user handles a remote controller (so called, keyless entry) to lock the door, a dealer carries out the door lock test with a failure diagnosis apparatus and the like.

For example, the computer program shown in this figure includes: a door lock failure diagnosis judgment program 201 that contributes to judge whether or not it is instructed to perform the door lock test with the failure diagnosis apparatus; a security judgment program 202 that contributes to perform the lock judgment with the security function; the door lock judgment program 203 that contributes to judge whether the switch on the door is handled to lock the door or not; a keyless entry judgment program 204 that contributes to judge whether the remote controller is handled to lock the door or not, and the like. These programs respectively contribute to output door lock requests when the conditions described above are satisfied. The door lock processing is performed when at least one door lock request is output by any program. However, when plural door lock requests are output simultaneously by plural programs, it is required to determine which door lock request is utilized for performing the door lock processing.

Thus, the computer program shown in the figure contributes to pass the door lock operation requests, which have been output by the door lock failure diagnosis judgment program 201, the security judgment program 202, door lock judgment program 203 and the keyless entry judgment program 204, to the priority judgment program 206 in order to judge the priorities of respective operation requests output simultaneously. The priority judgment program 205 contributes to select one operation request having the highest priority among the plural operation requests output simultaneously, and then contributes to pass the selected operation request to the door lock output program 206. The door lock output program 206 then, for example, contributes to control an actuator for locking the door of vehicle in accordance with the passed operation request. Therefore, the door lock processing is performed in accordance with a condition having the highest priority.

A patent document 1 proposes a control system that can add a new application for implementing a new function and further can minimize the effect on an existing application caused by the addition of new application. This control system utilizes a software configuration of service application that mediates between a client application and a server application, which are mounted on an electric control apparatus, and that performs transmission of required information with the electric control apparatus while performing a format conversion, an arbitration and the like. The service application can determine, in the case that operation requests are output from plural applications and compete with each other, which operation request should be preferred.

[Patent document 1] Japanese Patent Application Laid-Open No. 2008-74124

SUMMARY OF THE INVENTION

The recent control apparatus and computer program are complicated due to the sophisticated vehicle, and then such the complications cause increasing numbers of program that outputs the operation request, e.g., the door lock failure diagnosis judgment program 201 and the security judgment program 202. Thus, it is difficult for the developer of computer program to set the priorities for respective operation requests. Hence, a problem is considered for the computer program that the development time becomes longer and the development cost becomes higher. Further, a problem is considered that the complicated setting of priority causes increasing numbers of test pattern for the priority judgment of computer program and thus that the test period becomes longer. The control system proposed by the patent document 1 has not met sufficiently with the success solving these problems.

The present invention is made in view of such circumstances, and has an object to provide a control apparatus, a control system and a computer program that can prevent the priority judgment processing from being complicated even in the case that plural operation requests are output, and can facilitate the setting, the development, the test and the like.

A control apparatus of an aspect according to the present invention has an executing means for executing plural programs that respectively select and output operation requests for an equipment, makes the equipment perform an operation based on the operation request through executing the program, and comprises: a selecting means for selecting one or more programs to be executed based on an operation condition of the equipment; a changing means for changing a program executed by the executing means into the one or more programs selected by the selecting means; a storing means for previously storing priorities of the plural programs in association with the operation condition; and a priority identifying means for identifying priorities of plural operation requests based on the priorities stored by the storing means, in the case that the executed plural programs output the plural operations and the plural operations compete with each other, wherein the equipment performs an operation based on an operation request whose priority is identified to be high.

A control apparatus of another aspect according to the present invention further comprises plural executing means, each of which executes plural programs, wherein each executing means includes the storing means and the priority identifying means.

In addition, a control system of an aspect according to the present invention has a plurality of control apparatuses which are connected to be communicable, wherein a control apparatus comprises: an operation condition recognizing means for recognizing an operation condition of the equipment; and a sending means for sending the operation condition recognized by the operation condition recognizing means to another control apparatus, wherein the selecting means selects in accordance with the operation condition recognized by the operation condition recognizing means, said another control apparatus comprises a receiving means for receiving the operation condition sent by the control apparatus, wherein the selecting means selects in accordance with the operation condition received by the receiving means.

A control system of another aspect according to the present invention, wherein said another control apparatus further comprises: an obtaining means for obtaining information for which the operation condition recognizing means of the control apparatus requires to perform recognizing; and a sending means for sending the information obtained by the obtaining means to the control apparatus, and the control apparatus further comprises a receiving means for receiving the information sent from said another control apparatus, wherein the operation condition recognizing means performs recognizing in accordance with the information received by the receiving means.

Additionally, a control system of another aspect according to the present invention has the sending means of the control apparatus that sends the operation condition to all the other communicable control apparatuses.

A computer program of another aspect according to the present invention has plural program components that respectively select operation requests for an equipment, and make a computer execute the program components in order to make the equipment perform operations based on the operation requests, comprises: a selecting step of making the computer select one or more program components to be executed, in accordance with an operation condition of the equipment, among the plural program components; a changing step of changing the program component to be executed into the selected one or more program components; an identifying step of identifying priorities of plural operation requests based on priorities of the program components stored in association with the operation condition, in the case that the plural operation requests selected by the executed plural program components compete with each other; and a controlling step of making the equipment perform an operation based on an operation request whose priority is identified to be high.

Additionally, a computer program of another aspect according to the present invention, further comprises plural program groups, each of which comprises plural program components, wherein in each program group, the computer performs the identifying step.

According to the present invention, there are plural programs or program groups (hereinafter, simply called the programs) which contribute to output operation requests, and an executed program among the programs is limited in accordance with the operation condition (operation mode) of the equipment. As explained in reference to the computer program shown in FIG. 8, the operation mode of equipment can be selected previously, and can be a driver mode that performs the door lock processing when a driver handles to lock the door, a security mode that automatically performs the door lock processing, a maintenance mode that performs a trouble-shooting, and the like. The executed program may be previously set for each operation mode, and the executed program may be changed in accordance with the selection of operation mode.

In addition, the operation mode is previously stored in association with the priorities of programs executed for the operation mode. In the case that plural programs corresponding to the selected operation mode simultaneously lead outputting operation requests and the output operation request compete with each other, the judgment is performed about the priorities of competing operation requests in accordance with the previously stored priorities for respective programs. As described above, the number of programs to be executed is restricted for each operation mode. Therefore, it is possible to prevent the priority judgment processing from being complicated, and to facilitate several things for the program, such as the design, the development and the test. Furthermore, it is possible to facilitate several things for the control apparatus mounting this computer program, such as the design, the development and the test.

According to the present invention, the computer program is configured with plural program groups (executing means). For example, the computer program is configured with a platform layer including plural driver programs and an application layer including plural application programs. In this configuration, several processing are performed for each program group, such as the priority judgment processing of operation request based on the selected operation mode and the control processing of equipment based on the selected operation mode. Therefore, the developer can focus on the program development in each program group, and can develop the program identifying the priorities in each program group.

According to the present invention, the control system is configured with plural control apparatuses, each of which mounts the computer program described above and is communicably connected with each other. In this configuration, a control apparatus may identify the current operation mode and send the result to another control apparatus, and said another control apparatus may perform the changing processing based on the received result of operation mode. Therefore, plural control apparatuses can share common operation modes and perform control processing with the shared common operation modes. In the case that the control apparatus sends the result of operation mode to the other control apparatuses, it is efficient to send the result to all the other control apparatuses at once (so called broad cast).

According to the present invention, another control apparatus obtains information required for identification of operation mode and sends the obtained information to the control apparatus, and then the control apparatus receives the information and identifies the operation mode. Therefore, the control apparatus can obtain such the information indirectly from another control apparatus and then perform the identification of operation mode, even in the case that the control apparatus cannot directly obtain such the information.

According to the present invention, the executed program is restricted and changed in accordance with the selected operation mode of equipment, and the relationships among plural programs are divided into respective operation modes. Therefore, it is possible to prevent the priority judgment processing of operation request output by each program from being complicated. In the case that the priorities are previously stored for executed programs of each operation mode, the executed programs are changed in accordance with the selected operation mode, and the priority judgment is performed for the operation request from the executed plural programs, it is possible to perform the control processing based on the operation request whose priority is high. Therefore, it is possible to facilitate designing and developing the computer program that contributes to perform the priority judgment processing in the case that the operation requests compete with each other. Further, it is possible to facilitate designing and developing the control, apparatus mounting the computer program. Furthermore, it is possible to prevent increasing the number of test pattern required for the computer program that contributes to perform the priority judgment processing, and to shorten the test period.

The above and further objects and features of the invention will more fully be apparent from the following detailed description with accompanying drawings.

BRIEF DESCRIPTION OF THE DRAWINGS

FIG. 2 is a schematic view showing a software configuration of on-vehicle equipment control program according to the present invention.

FIG. 4 is a schematic view showing an example of priority judgment table.

DESCRIPTION OF THE PREFERRED EMBODIMENTS

Figure 1:
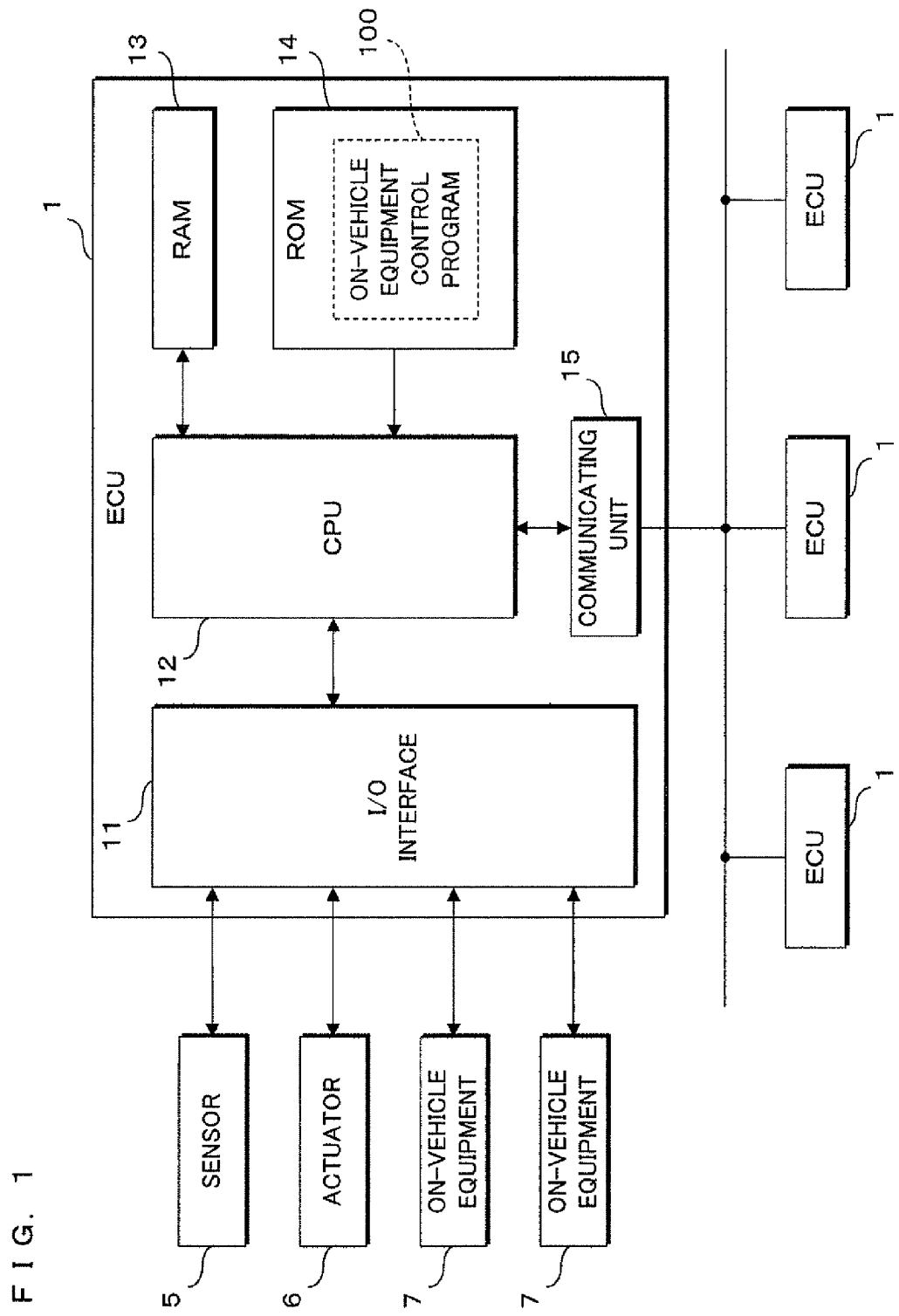
FIG. 1 is a block diagram showing a configuration of control system according to the present invention.

Hereinafter, an embodiment of the present invention is described in detail with reference to drawings. FIG. 1 is a block diagram showing a configuration of control system according to the present invention. In the drawings, a numeral "1" represents an ECU that controls a sensor 5, an actuator 6 and an on-vehicle equipment 7 mounted on a car. The ECU 1 corresponds to the control apparatus according to the present invention. The ECU 1 includes an input-output (I/O) interface 11 that is connected through a cable to the sensor 5, to the actuator 6 and to the on-vehicle equipment 7. The I/O interface 11 implements the transmission of data between the sensor 5, the actuator 6 and the on-vehicle equipment 7. Thus, it is possible to obtain several detection results from the sensor 5, give an operation instruction to the actuator 6 and perform data transmission with the on-vehicle equipment 7.

The ECU 1 further includes a central processing unit (CPU) 12 that performs several calculations, processing for controlling each component included in the ECU 1, and the like. To the CPU 12, the I/O interface 11 sends detection results of the sensor 5, data from the on-vehicle equipment 7, and the like. Vice versa, the interface 11 sends data from the CPU 12 to the actuator 6 and to the on-vehicle equipment 7. The CPU 12 reads out and executes an on-vehicle equipment control program (computer program) 100 that has been stored in a read only memory (ROM) 14 in advance. Thus, the CPU 12 can perform calculation processing, control processing and the like, store temporal data generated at such the several processing into a read access memory (RAM) 13, and proceed with the processing.

The ROM 14 is a non-volatile memory device, such as a mask ROM or an electrically erasable programmable ROM (EEPROM), and stores the on-vehicle equipment control program 100, data required for executing this program 100 (not shown) and the like, in advance. The RAM 13 is a memory device, such as a static RAM (SRAM) or a dynamic RAM (DRAM).

The ECU 1 is connected to other plural ECUs 1, 1, . . . , mounted on the car through a network, such as a controller area network (CAN), and includes a communicating unit 15 for performing data transmission with other ECUs 1, 1, . . . through the network. Since performing the data transmission with other ECUs 1, 1, . . . , the ECU 1 can obtain data from respective on-vehicle equipments connected to said other ECUs 1, 1, . . . , and control the operations of respective on-vehicle equipments connected to said other ECUs 1, 1, . . . . It is noted that a detailed configuration of only one ECU 1 is illustrated in FIG. 1 and configurations of the other ECUs 1, 1, . . . are omitted in FIG. 1.

FIG. 2 is a schematic view showing a software configuration of on-vehicle equipment control program 100 according to the present invention. The on-vehicle equipment control program 100 is a computer program configured with four hierarchal layers (program groups): a platform layer 101, a middleware layer 102, an application layer 103 and a system management layer 104.

The platform layer 101 includes plural programs (not shown). For example, the platform layer 101 includes respective programs for controlling the sensor 5, the actuator 6 and the on-vehicle equipment 7 that are connected by the I/O interface 11 of ECU 1, a program for making the communicating unit 15 perform the data transmission based on the CAN with other ECUs 1, 1, . . . , and the like. The programs of platform layer 101 contribute to obtain data from the sensor 5, the on-vehicle equipment 7 and the like, contribute to send the obtained data to the middleware layer 102, and contribute to control the operation of actuator 6, the on-vehicle equipment 7 and the like in accordance with operation instructions sent from the middleware layer 102.

The middleware layer 102 positions between the platform layer 101 and the application layer 103. In addition, the middleware layer 102 performs processing to receive data from the plat form layer 101, to convert the received data in a proper data format, and to send the converted data to the application layer 103. Vice versa, the middleware layer 102 performs processing to receive data from the application layer 103, to convert the received data in a proper data format, and to send the converted data to the platform layer 101. The middleware layer 102 includes plural programs, each of which contributes to perform such the data format conversion described above.

The application layer 103 includes plural programs (which are represented by AP1, AP2, . . . in FIG. 2). Based on previously defined requirement specification or the like, the programs AP1, AP2, . . . of application layer 103 contribute to select an operation of the actuator 6, the on-vehicle equipment 7 or the like, in accordance with data sent from the sensor 5, the on-vehicle equipment 7 or the like through the platform layer 101 or through the middleware layer 102. In addition, the programs AP1, AP2, . . . contribute to send operation instructions for the actuator 6, the on-vehicle equipment 7 and the like, as the output data, toward the middleware layer 102.

As described above, the outputs of sensor 5, on-vehicle equipment 7 and the like mounted on the car are converted into a data format by the program of platform layer 101 in the on-vehicle equipment control program 100 executed by the ECU 1, and the converted output data are sent to the middleware layer 102. The programs of middleware layer 102 contribute to receive data from the platform layer 101, contribute to convert the received data to be suitable for the application layer 103, and contribute to send the converted data to the application layer 103. The programs AP1, AP2, . . . of application layer 103 contribute to perform several calculation processing based on the data sent from the middleware layer 102, and thus contribute to select the operations of actuator 6, on-vehicle equipment 7 and the like.

The programs AP1, AP2, . . . of application layer 103 contribute to send the operation instructions, as the output data, to the middleware layer 102. The sent operation instructions are for making the actuator 6, the on-vehicle equipment 7 and the like perform the selected operations. The programs of middleware layer 102 contribute to convert the data sent from the application layer 103 to be data suitable to the platform layer 101, and contribute to send the converted data to the platform layer 101. Based on the data sent from the middleware layer 102, the programs of platform layer 101 contribute to control the actuator 6, the on-vehicle equipment 7 and the like.

As described above, the on-vehicle equipment control program 100 can contribute to obtain data from the sensor 5, the on-vehicle equipment 7 and the like, contribute to perform the transmission of data between the three hierarchal layers, contribute to perform processing based on the data at each hierarchal layer, and contribute to control the operations of actuator 6, the on-vehicle equipment 7 and the like. A developer of program at one hierarchal layer needs to know only about input-output data at the other hierarchal layers, but not just about data processing performed at the other hierarchal layers. Further, it is possible to properly categorize plural programs included in each hierarchal layer, for example, into groups based on type of equipment to be controlled, groups based on type of processing to be performed, groups based on type of data to be processed or the like. Furthermore, each of the plural programs included in each hierarchal layer can contribute to perform processing over the data transmission with another program.

The on-vehicle equipment control program 100 according to the present invention contributes to select an operation mode of on-vehicle equipment to be controlled, in accordance with a running condition of car, user's handling, or the like. Furthermore, the on-vehicle equipment control program 100 according to the present invention contributes to execute only a program associated with the selected operation mode at each hierarchal layer, for making the on-vehicle equipment perform the operation corresponding to this selected operation mode. The application layer 103 in FIG. 2 is illustrated to change the combination of programs to be executed for three operation modes: first mode, second mode and third mode. It should be noted that such the change-processing of combination is performed for three operation modes not only at the application layer 103, but also at the platform layer 101 and at the middleware layer 102, although details are omitted in FIG. 2.

The programs of system management layer 104 contribute to perform the processing for selecting an operation mode of on-vehicle equipment and the processing for changing programs to be executed at each hierarchal layer. The system management layer 104 is configured to perform independently from the platform layer 101, from the middleware layer 102 and from the application layer 103, and controls the programs in each hierarchal layer. As this ECU 1 is connected to another ECU 1 through the network, the programs of system management layer 104 in this ECU 1 can contribute to perform the data transmission with another program of another system management layer 104 in another on-vehicle equipment control program 100 that is executed by the connected another ECU 1.

The selecting processing for plural operation modes may not be always performed by such the on-vehicle equipment control program 100 of single ECU 1. Alternatively, it may be configured to leave a processing for selecting the first mode to a first ECU 1, and to leave another processing for selecting the second or third mode to a second ECU 1. In other words, it may be alternatively configured to differentiate the processing for selecting the operation mode executed by one ECU 1 from another processing for selecting the operation mode executed by another ECU 1, in accordance with the objective operation mode to be selected. In the alternative case, the system management layer 104 of each on-vehicle equipment control program 100 obtains information from the objective on-vehicle equipment to be controlled, identifies information required by the on-vehicle equipment control program 100 executed by another ECU 1 for selecting the operation mode among the obtained information, and sends the identified information through the network to the on-vehicle equipment control program 100 which requires the identified information.

The on-vehicle equipment control program 100 of single ECU 1 contributes to receive information sent by the on-vehicle equipment control program 100 of another ECU 1, and contributes to select the operation mode of own objective on-vehicle equipment to be controlled, in accordance with the received information and the information obtained from the own objective on-vehicle equipment to be controlled. Furthermore, in the case that the current operation mode must be changed, the on-vehicle equipment control program 100 of each ECU 1 contributes to send (broadcast) the selected operation mode toward all of the other ECUs 1, 1, . . . through the network, at once. Therefore, it is possible to utilize a common operation mode for controlling on-vehicle equipments in the plural ECUs 1, 1, . . . as well as the on-vehicle equipment control programs 100, 100, . . . of the plural ECUs 1, 1, . . . , which are mounted on the car and connected through the network with each other.

After sending the selected operation mode toward all of the other ECUs at once, the system management layer 104 of on-vehicle equipment control program 100 changes the programs to be executed by the platform layer 101, by the middleware layer 102 and by the application layer 103, into the combination of programs previously associated with the selected operation mode. Therefore, each hierarchal layer executes only the programs required just for the selected operation mode. In addition, the on-vehicle equipment control program 100 of another ECU 1 having received the operation mode sent at once also makes own system management layer 104 change the programs based on the received operation mode.

Figure 3A:
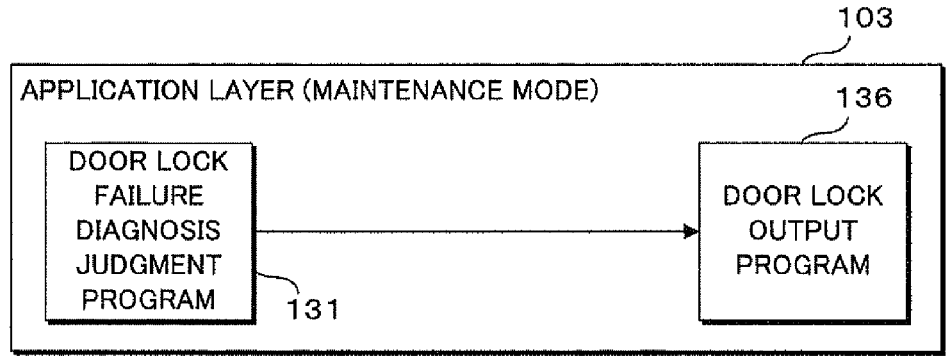
FIG. 3A is a schematic view showing an example of program executed for an operation mode.
Figure 3B:
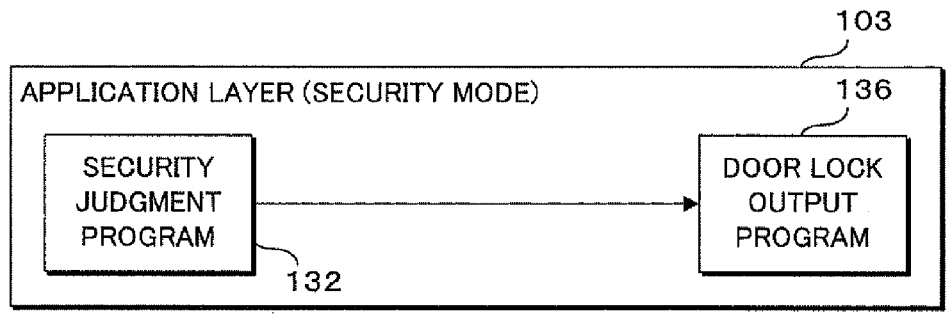
FIG. 3B is a schematic view showing an example of program executed for another operation mode.
Figure 3C:
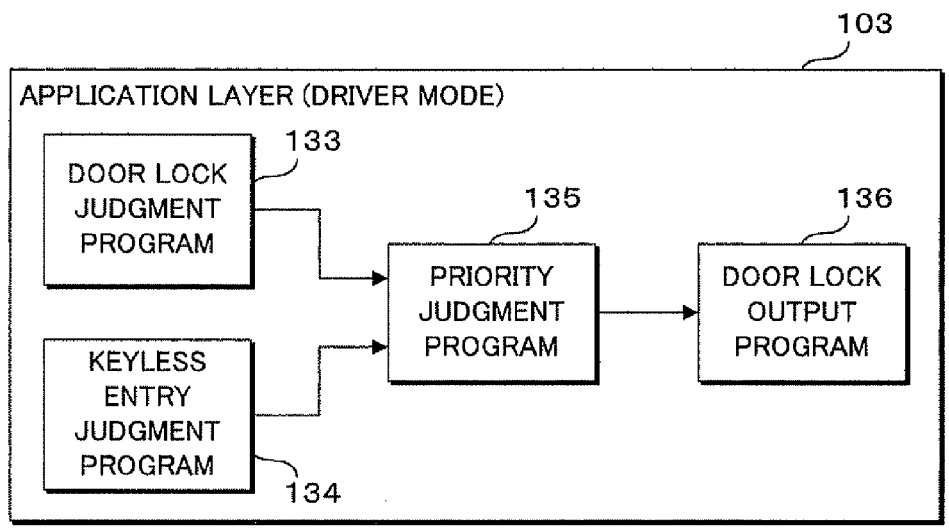
FIG. 3C is a schematic view showing an example of program executed for another operation mode.
Figure 8:
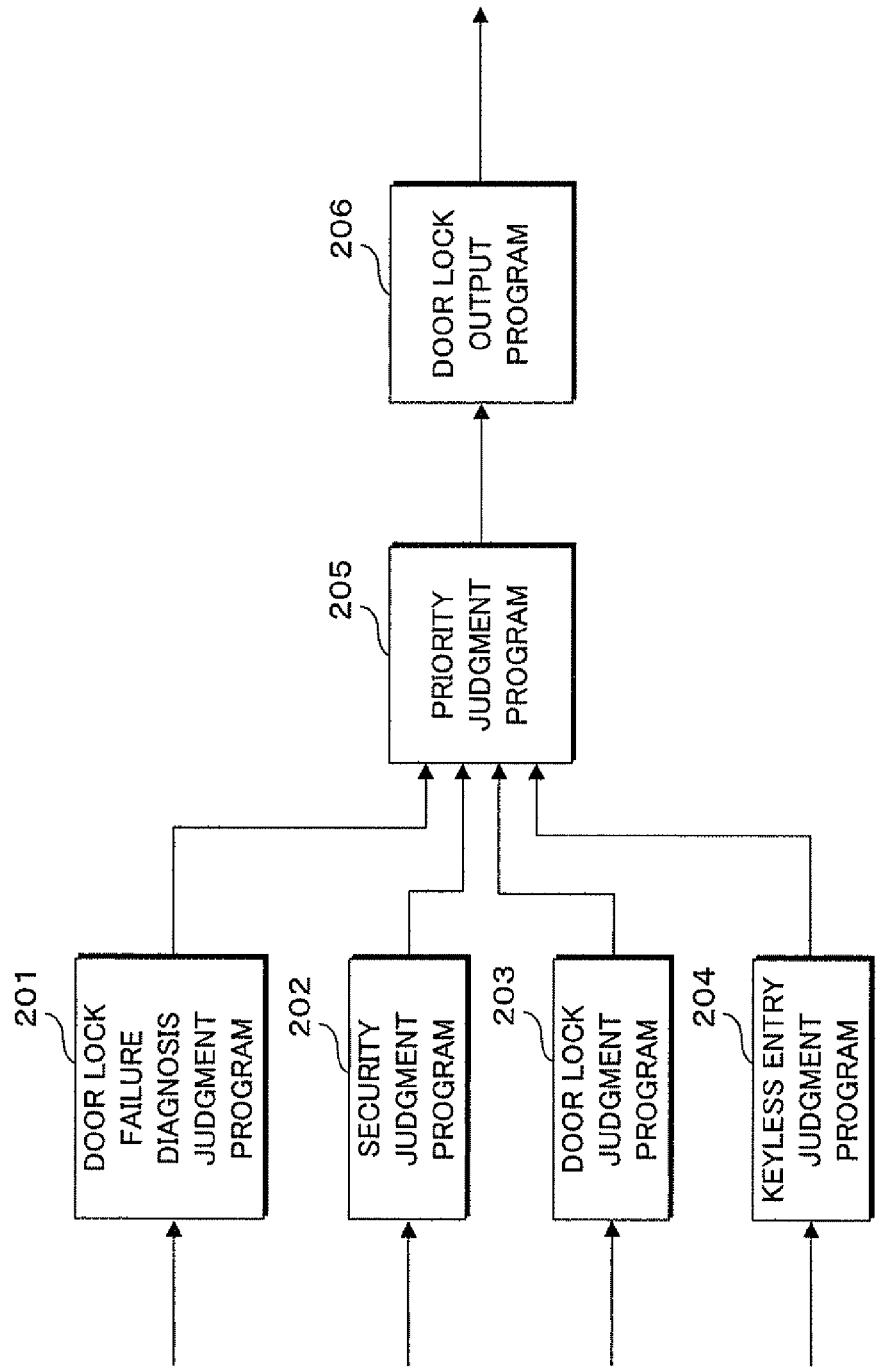
FIG. 8 is a schematic view for explaining processing performed by a conventional computer program controlling an on-vehicle equipment.

FIG. 3A, FIG. 3B and FIG. 3C are schematic views showing examples of programs executed for an operation mode. The examples shown in FIG. 3A, FIG. 3B and FIG. 3C are illustrated for the application layer 103 of on-vehicle equipment control program 100. The examples for the platform layer 101 and for the middleware layer 102 are similar to the examples shown in FIG. 3A, FIG. 3B and FIG. 3C, and thus are omitted. The application layer 103 shown in FIG. 3A, as well as in FIG. 3B and FIG. 3C, is an example of computer programs for performing the door-lock processing of the car, and is configured to have similar functions as the computer program shown in FIG. 8. Then, the on-vehicle equipment for the door-lock processing of the car is configured to work with the operation mode selected among three operation modes: maintenance mode, security mode and driver mode.

The maintenance mode is an operation mode for the shipping inspection during manufacturing the car, for the troubleshooting conducted by the dealer, or the like. When it is detected that an inspection apparatus is connected to any on-vehicle equipment or the network, the system management layer 104 selects the maintenance mode as the operation mode. The security mode is an operation mode for the case that the car is parked. A sensor is prepared for detecting a condition of ignition switch and a condition of seat on which the driver should sit down, and the system management layer 104 selects the security mode, as the operation mode, based on the results detected by the sensor. The driver mode is an operation mode for the case that the driver can drive the car. The system management layer 104 selects the driver mode, as the operation mode, in accordance with information about the condition of ignition switch, about the condition of seat lever, about results detected by a speed sensor of the car, and the like.

For example, when the maintenance mode is selected as the operation mode, the program of system management layer 104 contributes to execute a door lock failure diagnosis judgment program 131 and a door lock output program 136 of application layer 103, and thus contributes to perform the processing for controlling the door-lock (see FIG. 3A). In the case that a door lock test should be performed by a failure diagnosis apparatus, the door lock failure diagnosis judgment program 131 contributes to send an operation request for the door lock toward the door lock output program 136. This case does not require judging the priority because there is no program, other than the door lock failure diagnosis judgment program 131, which requires sending the operation request to the door lock output program 136. Based on the sent operation request, the door lock output program 136 contributes to output an operation request to the middleware layer 102 for making the on-vehicle equipment perform the door-lock processing. Thus, it is possible to control the door-lock operation of on-vehicle equipment, and to implement making the on-vehicle equipment perform an operation based on the operation request.

In the case that the security mode is selected as the operation mode, the program of system management layer 104 contributes to execute a security judgment program 132 and the door lock output program 136 of application layer 103, and thus contributes to perform the processing for controlling the door-lock (see FIG. 3B). The security judgment program 132 is for judging whether or not the door of car should be automatically locked now. In the case that the door should be automatically locked now, the operation request representing to perform automatic door-lock processing is sent to the door lock output program 136. This case does not require judging the priority because there is no program, other than the security judgment program 132, which requires sending the operation request to the door lock output program 136.

In the case that the driver mode is selected as the operation mode, the program of system management layer 104 contributes to execute a door lock judgment program 133, a keyless entry judgment program 134, a priority judgment program 135 and the door lock output program 136 of application layer 103, and thus contributes to perform the processing for controlling the door-lock (see FIG. 3C). The door lock judgment program 133 is for judging whether or not a user currently handles a switch mounted on the door for locking the door. When the user handles the switch for locking the door, an operation request is output in response to the handling for locking the door. A keyless entry judgment program 134 is for judging whether or not a user currently handles a remote controller for locking the door. When the user handles the remote controller for locking the door, an operation request is output in response to the handling for locking the door.

The operation requests of door lock judgment program 133 and of keyless entry judgment program 134 are respectively sent to the priority judgment program 135. When simultaneously receiving both operation requests of door lock judgment program 133 and of keyless entry judgment program 134, the priority judgment program 135 contributes to judge the priorities of these operation requests, and contributes to send the operation request having higher priority to the door lock output program 136. The priority judgment program 135 is provided with a priority judgment table, in which the priority of each Program is determined previously, and contributes to judge about the priority based on this priority judgment table.

FIG. 4 is a schematic view showing an example of priority judgment table. The priority judgment table stores information of operation modes, such as the maintenance mode, the security mode and the driver mode. Furthermore, the priority judgment table stores information of programs to be executed for respective operation modes, and information of priorities assigned to respective programs. Moreover, these information of operation modes, programs and priorities are associated with each other in the priority judgment table. The priority judgment program 135 contributes to refer the priorities assigned to respective programs stored in the priority judgment table, and contributes to identify the priority of received operation request. Therefore, the priority judgment program 135 can contribute to judge the priorities of these simultaneously received operation requests, and can contribute to send the received operation request having higher priority than the other.

Figure 5:
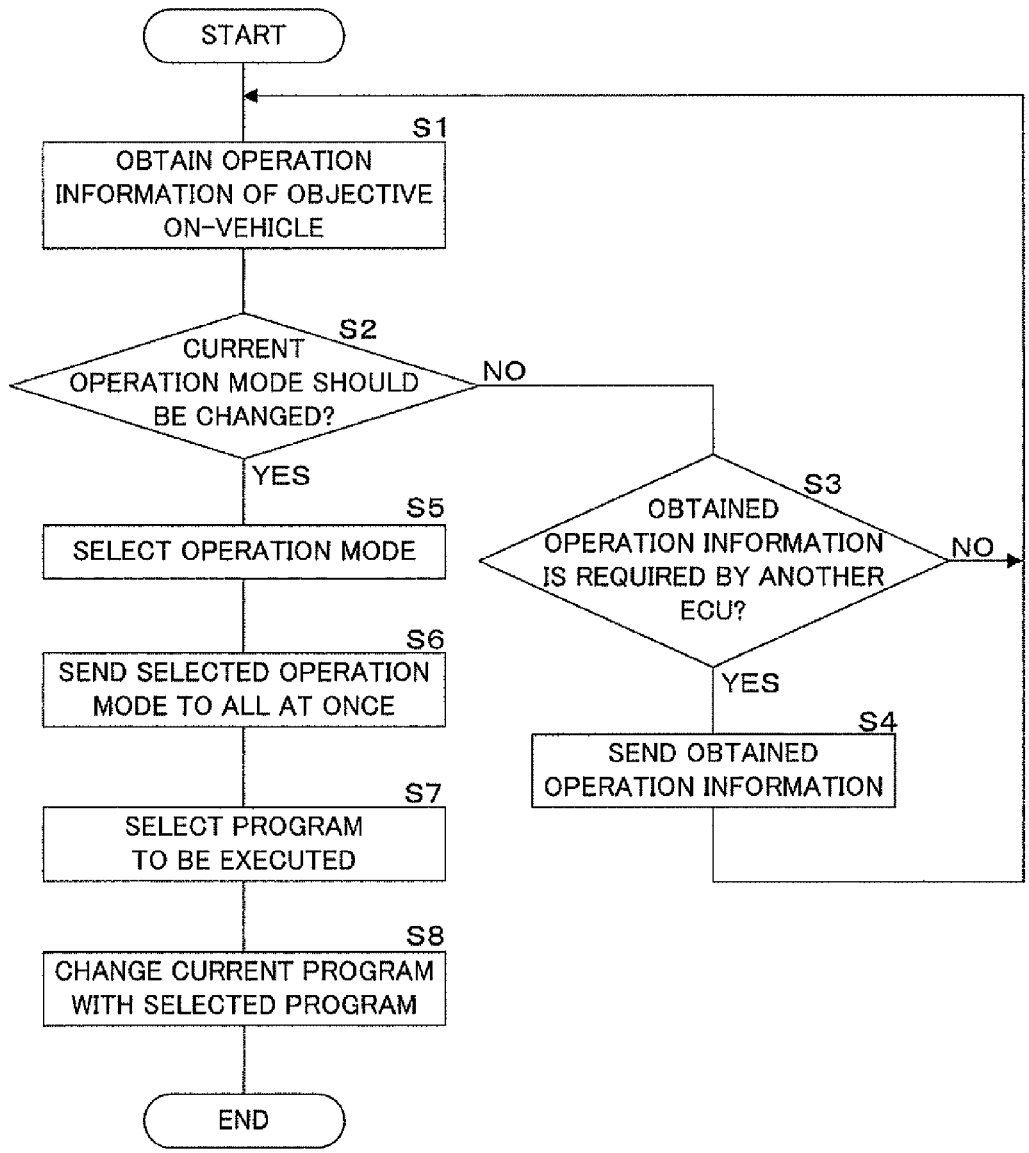
FIG. 5 is a flowchart showing a procedure performed by the system management layer for changing a program.

Next, it will be described with reference to a flowchart about processes performed by the on-vehicle equipment control program 100 according to the present invention. FIG. 5 is the flowchart showing a procedure performed by the system management layer 104 for changing a program, and is illustrated in the context of system management layer selecting the operation mode for itself. At first, a program of system management layer 104 contributes to obtain information about operations from an objective on-vehicle equipment to be controlled (step S1), and contributes to judge in accordance with the obtained information about operations whether current operation mode should be changed or not (step S2).

When it is judged that the current operation mode should not be changed (S2: NO), the program of system management layer 104 contributes to judge whether or not the obtained information about operations is required for such the operation mode judgment performed by another ECU 1 (step S3). When it is judged that the obtained information about operations is required for such the operation mode judgment performed by another ECU 1 (S3: YES), the program of system management layer 104 sends the obtained information about operations to said another ECU 1 that requires the obtained information about operations (step S4). After the obtained information about operations is sent to said another ECU 1, the program of system management layer 104 contributes to return the procedure to the step S1 and to repeat obtaining information about operations. Additionally, the program of system management layer 104 contributes to return the procedure to the step S1 and to repeat obtaining information about operations, when it is judged that the obtained information about operations is not required for such the operation mode judgment performed by another ECU 1 (S3: NO), too.

When it is judged that the current operation mode should be changed (S2:YES), the program of system management layer 104 contributes to select a proper operation mode based on the obtained information about operations of on-vehicle equipment (step S5), and to send the selected operation mode at once to the other ECUs 1, 1, . . . through the network (step S6). Next, the program of system management layer 104 contributes to select a program to be newly executed in accordance with the selected operation mode (step S7), to change the current program with the selected program (step S8), and to complete the procedure.

Figure 6:
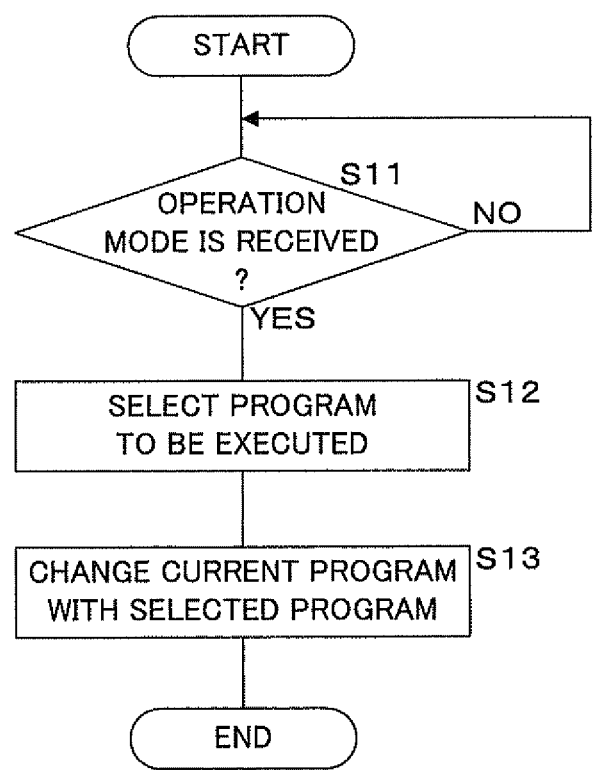
FIG. 6 is a flowchart showing a procedure performed by a system management layer for changing a program.

FIG. 6 is a flowchart showing a procedure performed by the system management layer for changing a program, and is illustrated in the context of system management layer receiving the operation mode having been selected by another ECU 1. A program of system management layer 104 contributes to judge whether or not one of the operation modes is received which have been sent at once through the network (step S11). When it is judged that such the operation mode is not received yet (S11: NO), the program of system management layer 104 contributes to wait until it is judged that such the mode is received. When it is judged that such the operation mode is received (S11: YES), the program of system management layer 104 contributes to select a program to be newly executed in accordance to the received operation mode (step S12), to change the current program with the selected program (step S13) and to complete the procedure.

Figure 7:
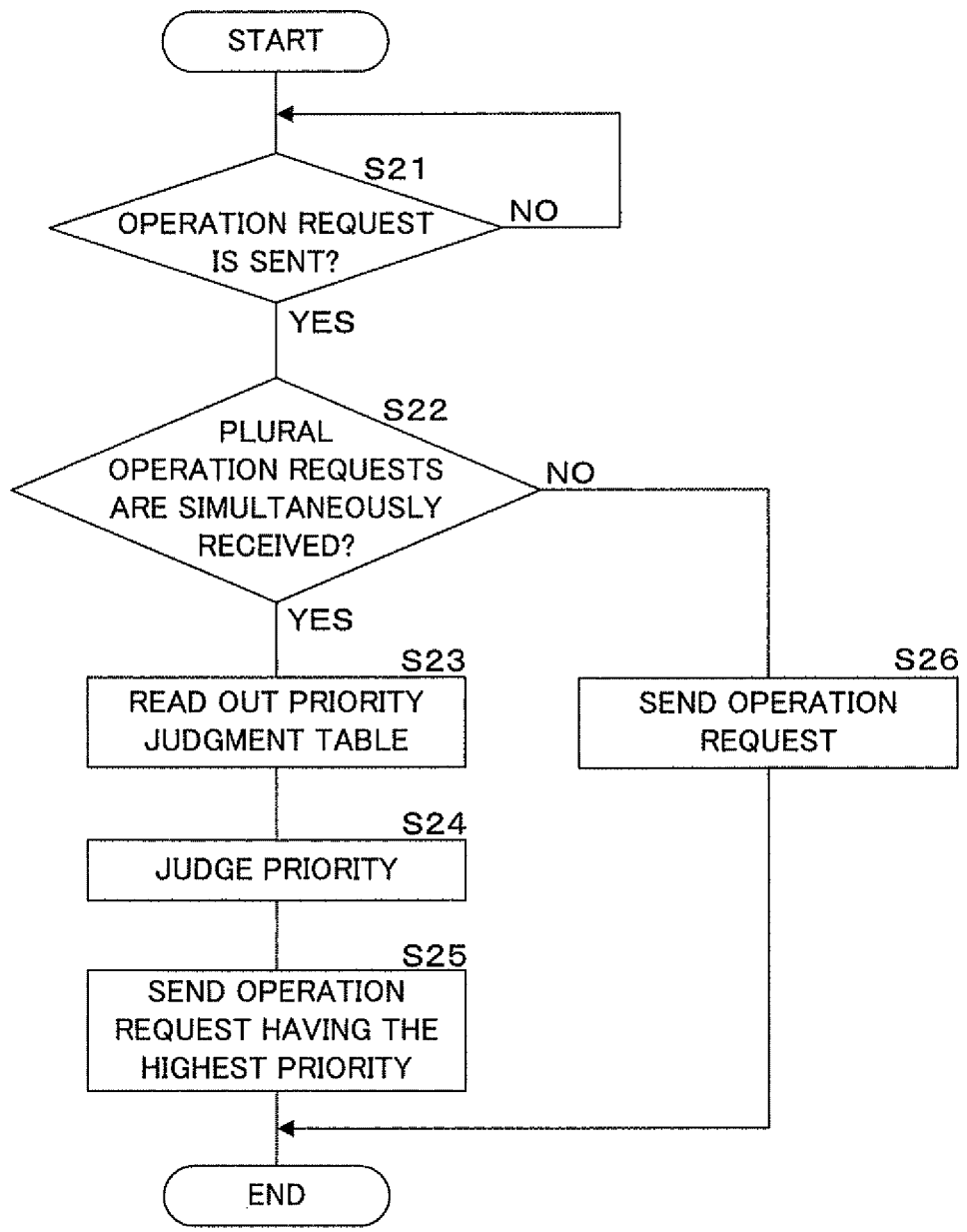
FIG. 7 is a flowchart showing a procedure of processing performed by a priority judgment program.

FIG. 7 is a flowchart showing a procedure of processing performed by the priority judgment program 135 and by each hierarchal layer of on-vehicle equipment control program 100. The priority judgment program 135 firstly contributes to judge whether or not an operation request is sent for the priority judgment program 135 by another program in the same hierarchal layer (step S21). When it is judged that such the operation request is not sent (S21: NO), the priority judgment program 135 contributes to wait until it is judged that such the operation request is sent.

When it is judged that such the operation request is sent (S21:YES), the priority judgment program 135 contributes to judge whether or not the sent operation request is one of plural operation requests having been simultaneously received for the priority judgment program 135 (step S22). When it is judged that the sent operation request is such the one of plural operation requests having been simultaneously received for the priority judgment program 135 (S22: YES), the priority judgment program 135 contributes to read out the priority judgment table that is previously stored (step S23), to judge the priorities of plural operation requests having been simultaneously received for the priority judgment program 135 (step S24), to send an operation request having the highest priority in the received plural operation requests (step S25), and to complete the procedure. When it is judged that the sent operation request is not such the one of plural operation requests having been simultaneously received for the priority judgment program 135 (S22: NO), the priority judgment program 135 contributes to send the sent operation request (step S26) and to complete the procedure.

In the configuration of on-vehicle equipment control program 100 described above, a program to be executed in each hierarchal layer is changed in accordance with the operation mode of on-vehicle equipment by the program of system management layer 104. Thus, it is possible to categorize the plural programs in each hierarchal layer into groups, even though the plural programs are complicated with each other. Furthermore, it is possible to prevent the priority judgment processing from complicating for the operation request sent from each program. Moreover, it is possible to carry out proper priority judgment processing for each operation mode, because the priority judgment table is configured to previously store the priority assigned to the program for each operation mode and the priority judgment program 135 contributes to judge the priority of operation request based on the priority judgment table. Therefore, it is possible to facilitate designing and developing the on-vehicle equipment control program 100 and to facilitate carrying out the test of on-vehicle equipment control program 100 regarding to the priority judgment processing. Furthermore, it is possible to facilitate designing and developing the ECU 1 and to facilitate carrying out the test of ECU 1 on which the on-vehicle equipment control program 100 is mounted. Moreover, it is possible to facilitate designing and developing the control system and to facilitate carrying out the test of control system including the ECU 1 connected to the network.

The developer can focus on developing the programs per the hierarchal layer, because the on-vehicle equipment control program 100 is configured to include hierarchized layers, such as the platform layer 101, the middleware layer 102 and the application layer 103, and each hierarchized layer is configured to perform the priority judgment for the operation request and to perform the control of on-vehicle equipment based on the operation request having higher priority. In other words, the developer can develop the program of just single hierarchal layer for the priority judgment processing, separately from the other hierarchal layers. Therefore, it is possible to facilitate designing and developing the on-vehicle equipment control program 100 and to facilitate carrying out the test of on-vehicle equipment control program 100.

In addition, it is possible to utilize a common operation mode for whole of the control system including plural ECUs 1, 1, . . . , in order to control the on-vehicle equipment, because the on-vehicle equipment control program 100 is mounted on each ECU 1, such the plural ECUs 1, 1, . . . are connected through the network, such the ECU 1 is configured to select the operation mode and to send the selected operation mode to another ECU 1, and said another ECU 1 is configured to receive the selected operation mode and to change the current program with the program to be executed in accordance with the received operation mode. Furthermore, it is possible to facilitate and assure sending the operation modes to all the ECUs 1, 1, . . . , because single ECU 1 sends all the operation modes to the other ECUs 1, 1, . . . at once. Moreover, the on-vehicle equipment control program 100 can contribute to select the operation mode in consideration of information even which cannot be directly provided to the ECU 1 that performs the selecting processing of the operation mode, because each ECU 1 is configured to obtain information about operations from the objective on-vehicle equipment to be controlled and the obtained information are configured to be sent to the ECU 1 that performs the selecting processing of operation mode.

In this embodiment, the on-vehicle equipment control program 100 is illustrated to consist of three hierarchal layers: the platform layer 101, the middleware layer 102 and the application layer 103. However, the present invention is not limited to three hierarchal layers. Alternatively, the on-vehicle equipment control program 100 may consist of two or not less than four hierarchal layers. In addition, this embodiment is illustrated to include the independent system management layer 104 whose program contributes to change the program to be executed. However, the present invention is not limited to this illustration. Alternatively, it may be configured to change the program to be executed, with utilizing the programs of platform layer 101, of middleware layer 102 or of application layer 103. In this embodiment, the on-vehicle equipment control program 100 is utilized for explaining the computer program controlling the equipment. However, the present invention is not limited to this on-vehicle equipment control program 100. Alternatively, similar configurations may be applied to another computer program that contributes to control such equipment. Although FIG. 3A, FIG. 3B and FIG. 3C illustrate configurations of application layer 103, these illustrated configurations are examples and the present invention is not limited to these illustrated configurations.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A first control apparatus that controls a connected first device and the first control apparatus being connected to a second control apparatus that controls a connected second device, wherein the first control apparatus comprises:
a first storing unit that stores plural programs which are categorized into plural executive groups;
a first obtaining unit that obtains first operation condition information representing an operation condition of the first device from the first device;
a first group selecting unit that selects an executive group from the plural executive groups, in accordance with the first operation condition information obtained by the first obtaining unit;
a sending unit that sends information about the executive group selected by the first group selecting unit to the second control apparatus;
a first priority table that registers priorities of programs categorized in the executive group which is selected by the first group selecting unit;
a first program selecting unit that selects a program based on the first priority table from programs categorized into the executive group which is selected by the first group selecting unit; wherein
the first storing unit further stores plural programs for obtainment which are categorized in plural obtainment groups,
the first group selecting unit selects an obtainment group from the plural obtainment groups, in accordance with the first operation condition information obtained by the first obtaining unit,
the first priority table further registers priorities of obtainment programs categorized in the obtainment group which is selected by the first group selecting unit,
the first program selecting unit selects an obtainment program based on the first priority table from the obtainment programs categorized in the obtainment group which is selected by the first group selecting unit,
the first obtaining unit converts the obtained first operation condition information in accordance with the obtainment program selected by the first program selecting unit and sends the converted first operation condition information to a first executing unit, and
the first executing unit performs a first execution processing of the program selected by the first program selecting wherein the first execution processing is based on the converted first operation condition information,
a first controlling unit that controls the device in accordance with a result of the execution processing performed by the executing unit, and
the second control apparatus comprises:
a second storing unit that stores plural programs which are categorized into plural executive groups;
a second obtaining unit that obtains second operation condition information representing an operation condition of the second device from the second device;
a receiving unit that receives the information about the executive group selected by the first group selecting unit, sent from the sending unit;
a second group selecting unit that selects the executive group from the plural executive groups, in accordance with the information received by the receiving unit;
a second priority table that registers priorities of programs categorized in the executive group which is selected by the second group selecting unit;
a second program selecting unit that selects a program based on the second priority table from programs categorized into the executive group which is selected by the second group selecting unit; wherein
the second storing unit further stores plural programs for obtainment which are categorized in plural obtainment groups,
the second group selecting unit selects an obtainment group from the plural obtainment groups, in accordance with the information received by the receiving unit,
the second priority table further registers priorities of obtainment programs categorized in the obtainment group which is selected by the second group selecting unit,
the second program selecting unit selects an obtainment program based on the second priority table from the obtainment programs categorized in the obtainment group which is selected by the second group selecting unit,
the second obtaining unit converts the obtained second operation condition information in accordance with the obtainment program selected by the second program selecting unit and sends the converted second operation condition information to a second executing unit, and
the second executing unit performs a second execution processing of the program selected by the second program selecting unit wherein the second execution processing is based on the converted second operation condition information,
a second controlling unit that controls the second device in accordance with a result of the second execution processing performed by the second executing unit.

2. The first control apparatus according to claim 1, wherein the program selected by the first program selecting unit has a priority highest in the programs categorized in the executive group which is selected by the first group selecting unit.

3. The first control apparatus according to claim 1, wherein
the first storing unit further stores plural programs for controlment which are categorized in plural controlment groups,
the first group selecting unit selects an controlment group from the plural controlment groups, in accordance with the first operation condition information obtained by the first obtaining unit,
the first priority table further registers priorities of controlment programs categorized in the controlment group which is selected by the first group selecting unit,
the first program selecting unit selects a controlment program based on the first priority table from the controlment programs categorized in the controlment group which is selected by the first group selecting unit,
the first controlling unit converts a result of the performed execution processing in accordance with the controlment program selected by the first program selecting unit, and
the first controlling unit controls the first device in accordance with the converted result of the execution processing.

4. The first control apparatus according to claim 1, wherein:
said second control apparatus selects the executive group in which the program to be selected by the program selecting unit is categorized, from the plural executive groups stored by the second storing unit, in accordance with the first operation condition information obtained by the first obtaining unit.

5. The first control apparatus according to claim 1, wherein
the first control apparatus is an electronic control unit mounted on a vehicle,
the first device is mounted on the vehicle, and
the plural executive groups include a group for driving the vehicle and a group for carrying out a maintenance on the vehicle.

6. The first control apparatus according to claim 5, wherein
the plural programs stored by the first storing unit are for locking a door mounted on the vehicle.

7. The first control apparatus according to claim 5, wherein
a sensor and an actuator are connected, as the first device, to the first control apparatus,
the first obtaining unit obtains the first operation condition information from the sensor, and
the first controlling unit controls the actuator.

8. A control system having a first control apparatus that controls a connected first device and having a second control apparatus that controls a connected second device and is connected to the first control apparatus, wherein
the first control apparatus comprises:
a first storing unit that stores plural programs which are categorized into plural executive groups;
a first obtaining unit that obtains first operation condition information representing an operation condition of the first device from the first device;
a first group selecting unit that selects an executive group from the plural executive groups, in accordance with the first operation condition information obtained by the first obtaining unit;
a sending unit that sends information about the executive group selected by the first group selecting unit to the second control apparatus;
a first priority table that registers priorities of programs categorized in the executive group which is selected by the first group selecting unit;
a first program selecting unit that selects a program based on the first priority table from programs categorized into the executive group which is selected by the first group selecting unit; wherein
the first storing unit further stores plural programs for obtainment which are categorized in plural obtainment groups,
the first group selecting unit selects an obtainment group from the plural obtainment groups, in accordance with the first operation condition information obtained by the first obtaining unit,
the first priority table further registers priorities of obtainment programs categorized in the obtainment group which is selected by the first group selecting unit, the first program selecting unit selects an obtainment program based on the first priority table from the obtainment programs categorized in the obtainment group which is selected by the first group selecting unit,
the first obtaining unit converts the obtained first operation condition information in accordance with the obtainment program selected by the first program selecting unit and sends the converted first operation condition information to a first executing unit, and
the first executing unit performs a first execution processing of the program selected by the first program selecting unit wherein the first execution processing is based on the converted first operation condition information;
a first controlling unit that controls the first device in accordance with a result of the first execution processing performed by the first executing unit, and
the second control apparatus comprises:
a second storing unit that stores plural programs which are categorized into plural executive groups;
a second obtaining unit that obtains second operation condition information representing an operation condition of the second device from the second device;
a receiving unit that receives the information about the executive group selected by the first group selecting unit, sent from the sending unit;
a second group selecting unit that selects an executive group from the plural executive groups, in accordance with the information received by the receiving unit;
a second priority table that registers priorities of programs categorized in the executive group which is selected by the second group selecting unit;
a second program selecting unit that selects a program based on the second priority table from programs categorized into the executive group which is selected by the second group selecting unit; wherein
the second storing unit further stores plural programs for obtainment which are categorized in plural obtainment groups,
the second group selecting unit selects an obtainment group from the plural obtainment groups, in accordance with the information received by the receiving unit,
the second priority table further registers priorities of obtainment programs categorized in the obtainment group which is selected by the second group selecting unit,
the second program selecting unit selects an obtainment program based on the second priority table from the obtainment programs categorized in the obtainment group which is selected by the second group selecting unit, the second obtaining unit converts the obtained second operation condition information in accordance with the obtainment program selected by the second program selecting unit and sends the converted second operation condition information to a second executing unit, and the second executing unit performs a second execution processing of the program selected by the second program selecting unit wherein the second execution processing is based on the converted second operation condition information, a second controlling unit that controls the second device in accordance with a result of the second execution processing performed by the second executing unit.

9. A control system according to claim 8, wherein the program selected by the first program selecting unit has a priority highest in the programs categorized in the executive group which is selected by the first group selecting unit, and the program selected by the second program selecting unit has a priority highest in the programs categorized in the executive group which is selected by the second group selecting unit.

10. A control system according to claim 8, wherein the second control apparatus further comprises:

a select information obtaining unit that obtains information required by the first group selecting unit for selecting; and a select information sending unit that sends the information required by the first group selecting unit to the first control apparatus, the first control apparatus further comprises a select information receiving unit that receives the information sent by the select information sending unit, and the first group selecting unit utilizes the information received by the select information receiving unit, for selecting the executive group from the plural executive groups.

11. A control system according to claim 8, further comprising:

a third control apparatus, wherein the sending unit sends the information about the executive group selected by the first group selecting unit, not only to the second control apparatus but also the third control apparatus, at once.

12. A control system according to claim 8, wherein the first storing unit further stores plural programs for controlment which are categorized in plural controlment groups, the first group selecting unit selects an controlment group from the plural controlment groups, in accordance with the first operation condition information obtained by the first obtaining unit, the first priority table further registers priorities of controlment programs categorized in the controlment group which is selected by the first group selecting unit, the first program selecting unit selects a controlment program based on the first priority table from the controlment programs categorized in the controlment group which is selected by the first group selecting unit, the first controlling unit converts the result of the first execution processing in accordance with the controlment program selected by the first program selecting unit, the first controlling unit controls the first device in accordance with the converted result of the execution processing, the second storing unit further stores plural programs for controlment which are categorized in plural controlment groups, the second group selecting unit selects an controlment group from the plural controlment groups, in accordance with the information received by the receiving unit, the second priority table further registers priorities of controlment programs categorized in the controlment group which is selected by the second group selecting unit, the second program selecting unit selects a controlment program based on the second priority table from the controlment programs categorized in the controlment group which is selected by the second group selecting unit, the second controlling unit converts the result of the second execution processing in accordance with the controlment program selected by the second program selecting unit, and the controlling unit controls the second device in accordance with the converted result of the second execution processing.

13. A control system according to claim 8, wherein the first control apparatus and the second control apparatus are electronic control units mounted on a vehicle, the first device and the second device are mounted on the vehicle, and the plural executive groups stored by the first storing unit and the plural executive groups stored by the second storing unit respectively include a group for driving the vehicle and a group for carrying out a maintenance on the vehicle.

14. A control system according to claim 8, wherein the plural programs stored by the first storing unit are for locking a door mounted on the vehicle.

15. A control system according to claim 8, wherein a sensor and an actuator are connected, as the first device, to the first control apparatus, the first obtaining unit obtains the first operation condition information from the sensor, and the first controlling unit controls the actuator.

16. A first non-transitory computer readable medium having stored thereon a first computer executable program for controlling a first device connected to a first control apparatus having a first storing unit that stores plural programs and the first non-transitory computer readable medium connected to a second non-transitory computer readable medium having stored thereon a second computer executable program for controlling a second device connected to a second control apparatus having a second storing unit that stores plural programs, wherein the first computer program when executed causes a computer system to execute steps of:

categorizing the plural programs stored by the first storing unit into plural executive groups;

obtaining operation condition information representing a first operation condition of the first device, from the first device;

selecting an executive group from the plural executive groups, in accordance with the obtained first operation condition information;

sending information about the selected executive group selected in accordance with the obtained first operation condition information to the second control apparatus;

selecting a program having the highest priority in programs categorized into the selected executive group; wherein:

the first storing unit stores further plural programs for obtainment, and the first computer program when executed causes the computer system to execute further steps of:
categorizing the plural programs for obtainment stored by the first storing unit, into plural obtainment groups;
selecting an obtainment group from the plural obtainment groups, in accordance with the obtained first operation condition information;
selecting a program for obtainment having the highest priority in programs for obtainment categorized into the selected obtainment group; and
converting the obtained first operation condition information in accordance with the selected program for obtainment;
performs a first execution processing of the selected program while utilizing the converted first operation condition information, and
controlling the first device in accordance with performed first execution processing of the selected program, and
the second computer program when executed causes a computer system to execute steps of:
categorizing the plural programs stored by the second storing unit into plural executive groups;
obtaining operation condition information representing a second operation condition of the second device, from the second device;
receiving information about the selected executive group selected in accordance with the obtained first operation condition information, sent by the first computer program;
selecting an executive group from the plural executive groups, in accordance with the information received from the first computer program;
selecting a program having the highest priority in programs categorized into the selected executive group; wherein
the second storing unit stores further plural programs for obtainment, and
the computer program when executed causes the computer system to execute further steps of:
categorizing the plural programs for obtainment stored by the second storing unit, into plural obtainment groups;
selecting an obtainment group from the plural obtainment groups, in in accordance with the information received from the first computer program;
selecting a program for obtainment having the highest priority in programs for obtainment categorized into the selected obtainment group; and
converting the obtained second operation condition information in accordance with the selected program for obtainment;
performs a second execution processing of the selected program while utilizing the converted second operation condition information; and
controlling the second device in accordance with performed second execution processing of the selected program.

17. The first non-transitory computer readable medium according to claim 16, wherein
the first storing unit stores further plural programs for controlment, and
the first computer program when executed causes the computer system to execute further steps of:
categorizing the plural programs for controlment stored by the first storing unit, into plural controlment groups;
selecting a controlment group from the plural controlment groups, in accordance with the obtained first operation condition information;
selecting a program for controlment having the highest priority in programs for controlment categorized into the selected controlment group;
converting a result of the performed first execution processing in accordance with the selected controlment program; and
utilizing the converted result of the performed first execution processing for controlling the first device.

\* \* \* \* \*